A. F. SMITH.
Locomotive Truck.

No. 34,377.

2. Sheets—Sheet 1.

Patented Feb. 11, 1862.

Witnesses:
Lemuel W. Serrell
Thos Geo Harold

Inventor:
Alba F. Smith

A. F. SMITH.
Locomotive Truck.

No. 34,377.

2 Sheets—Sheet 2.

Patented Feb. 11, 1862.

Witnesses:
Lemuel W. Serrell
Thos. Geo. Harold

Inventor:
Albee F. Smith

UNITED STATES PATENT OFFICE.

ALBA F. SMITH, OF NORWICH, CONNECTICUT.

IMPROVEMENT IN TRUCKS FOR LOCOMOTIVES.

Specification forming part of Letters Patent No. 34,377, dated February 11, 1862.

*To all whom it may concern:*

Be it known that I, ALBA F. SMITH, of Norwich, New London county, State of Connecticut, have invented, made, and applied to use a certain new and useful Improvement in Trucks for Locomotive-Engines; and I do hereby declare that the following is a full, clear, and exact description of the said invention, reference being had to the annexed drawings, making part of this specification, wherein—

Figure 1:
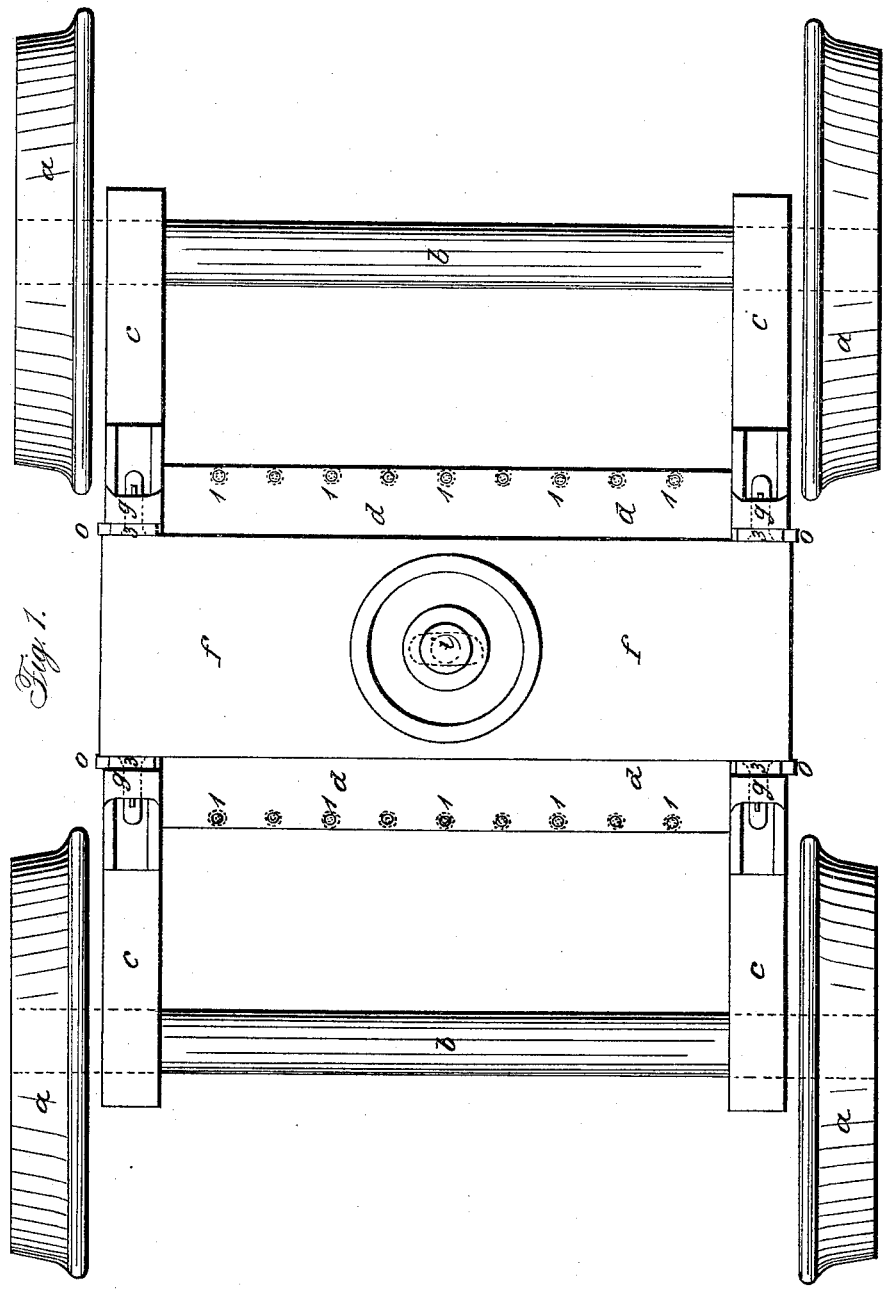
Figure 2:
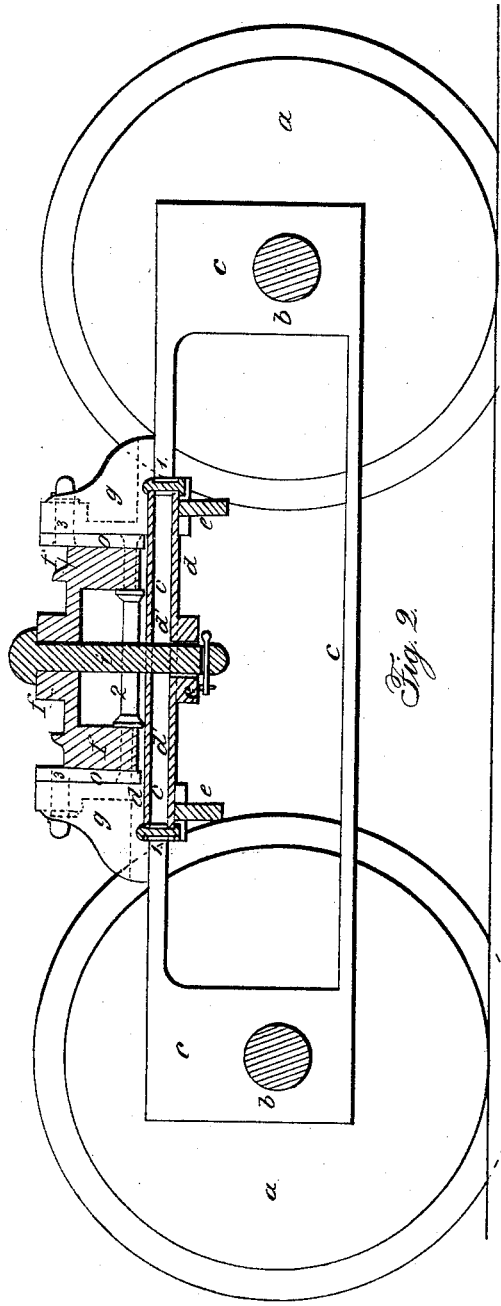
Figure 3:
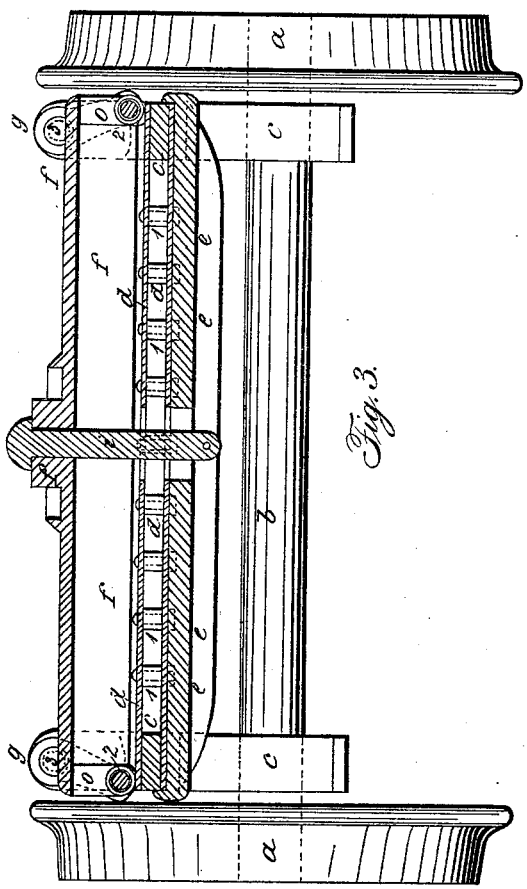

Figure 1 is a plan of my truck. Fig. 2 is a vertical longitudinal section, and Fig. 3 is a transverse section.

Similar marks of reference denote the same parts.

Several laterally-moving trucks have heretofore been made and applied to railroad-cars. My invention does not relate, broadly, to such laterally-moving trucks; but my said invention consists in the employment, in a locomotive-engine, of a truck or pilot wheels provided with pendent links to allow of a lateral movement, so that the driving-wheels of the locomotive-engine continue to move correctly on a curved track in consequence of the lateral movement allowed by said pendent links, the forward part of the engine traveling as a tangent to the curve, while the axles of the drivers are parallel, or nearly so, to the radial line of curve.

In the drawings I have represented my improved truck itself. The mode of applying the same to any ordinary locomotive-engine will be apparent to any competent mechanic, as my truck can be fitted in the place of those already constructed, or the same may be altered to include my improvement.

In the drawings, *a a* are wheels, *b b* are the axles, and *c* the frame, of any ordinary locomotive-truck made in any usual manner.

*d* is the center cross-bearing plate or platform, made of two thicknesses of iron plate riveted together, as shown at 1 1, and embracing the upper bars of the frame *c* at the ends of said plates. *e e* are cross-bars beneath the said double bearing-plate *d* to strengthen the parts.

*f* is a bolster, made of a flanged bar, through the center of which the king-bolt *i* passes, and said king-bolt also goes through an elongated opening in the plates *d*, so as to allow of lateral motion to the truck beneath the bolster. At the same time the king-bolt becomes a connection to hold the truck to the engine. This bolster *f* takes the weight of engine in the middle and is itself suspended at the ends by the bars 2 2, attached to the moving ends of pendent links *o o*, that are attached by bolts 3 3 at their upper ends to the brackets *g g* on the frame *c*. The distance between the bars 2 2 transversely of the truck is slightly more than that between the bolts 3 3, so that the pendent links *o o* diverge slightly.

When running upon a straight road the engine preserves great steadiness, because any change of position transversely of the track in consequence of the engine moving over the truck or the truck beneath the engine is checked by the weight of the engine hanging upon the links *o o*, and in consequence of their divergence any side movement causes the links on the side toward which the movement occurs to assume a more inclined position, while the other links come vertical, or nearly so. Hence the weight of the engine acts with a leverage upon the most inclined links to bring them into the same angle as the others, greatly promoting the steadiness of the engine in running on a straight line. As the pilot or truck wheels enter a curve a sidewise movement is given to the truck in consequence of the engine and drivers continuing to travel as a tangent to the curve of track. This movement and the slight turn of the whole truck on the king-bolt *i* not only cause the truck-wheels to travel correctly on the track with their axles parallel to the radial line of the curve of track, but also elevate the outer side of the engine, preventing any tendency to run off the track upon the outer side of the curve. Upon entering a straight track the truck again assumes the central position, and in case of irregularity in the track or any obstruction the truck moves laterally without disturbing the movement of the engine.

I do not claim laterally-moving trucks nor pendent links separately considered; but

What I claim, and desire to secure by Letters Patent, is—

The employment, in a locomotive-engine, of a truck or pilot wheels fitted with the pendent links o o to allow of lateral motion to the engine, as specified, whereby the drivers of said engine are allowed to remain correctly on the track in consequence of the lateral motion of the truck allowed for by said pendent links when running on a curve, as set forth.

In witness whereof I have hereunto set my signature this 10th day of July, 1861.

ALBA F. SMITH.

Witnesses:
 LEMUEL W. SERRELL,
 THOS. GEO. HAROLD.